United States Patent
Wu et al.

(10) Patent No.: US 10,764,202 B2
(45) Date of Patent: Sep. 1, 2020

(54) CONTAINER-BASED MOBILE CODE OFFLOADING SUPPORT SYSTEM IN CLOUD ENVIRONMENT AND OFFLOADING METHOD THEREOF

(71) Applicant: HUAZHONG UNIVERSITY OF SCIENCE AND TECHNOLOGY, Wuhan, Hubei (CN)

(72) Inventors: Song Wu, Hubei (CN); Chao Niu, Hubei (CN); Hai Jin, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 628 days.

(21) Appl. No.: 15/258,763

(22) Filed: Sep. 7, 2016

(65) Prior Publication Data
US 2017/0289059 A1    Oct. 5, 2017

(30) Foreign Application Priority Data

Mar. 29, 2016    (CN) .......................... 2016 1 0185722

(51) Int. Cl.
*H04L 29/08*    (2006.01)
*H04L 12/24*    (2006.01)
(Continued)

(52) U.S. Cl.
CPC .............. *H04L 47/70* (2013.01); *G06F 9/455* (2013.01); *G06F 9/45558* (2013.01);
(Continued)

(58) Field of Classification Search
None
See application file for complete search history.

(56) References Cited

U.S. PATENT DOCUMENTS

| | | | |
|---|---|---|---|
| 2015/0120928 A1* | 4/2015 | Gummaraju | H04L 67/1008 709/226 |
| 2015/0229645 A1* | 8/2015 | Keith | H04L 41/50 726/4 |
| 2016/0381116 A1* | 12/2016 | Hui | H04L 67/1097 455/425 |

* cited by examiner

*Primary Examiner* — Nicholas R Taylor
*Assistant Examiner* — Ho T Shiu
(74) *Attorney, Agent, or Firm* — Hamre, Schumann, Mueller & Larson, P.C.

(57) ABSTRACT

The present invention discloses a container-based mobile code offloading support system in a cloud environment and the offloading method thereof, comprising a front-end processing layer, a runtime layer and a back-end resource layer. The front-end processing layer is responsible for responding to an arrived request and managing a status of a container, which is realized by a request distribution module, a code caching module and a monitoring and scheduling module; the runtime layer provides the same execution environment as that of a terminal, which is realized by a runtime module consisted of a plurality of mobile cloud containers; and the back-end resource layer solves incompatibility of a cloud platform with an mobile terminal environment and provides underlying resource support for a runtime, which is realized by a resource sharing module and an extended kernel module within a host operating system. The present invention utilizes the built mobile cloud container as the runtime environment for offloading code, ensuring execution requirements of offloading tasks and improving the computing performance of a cloud; cooperation between respective modules makes a further optimization to the performance of the platform, guaranteeing an efficient operation for the system.

4 Claims, 3 Drawing Sheets

(51) Int. Cl.
*H04L 29/06* (2006.01)
*G06F 9/50* (2006.01)
*H04L 12/911* (2013.01)
*G06F 9/455* (2018.01)

(52) U.S. Cl.
CPC ........ *G06F 9/5027* (2013.01); *H04L 67/2833* (2013.01); *H04L 67/2838* (2013.01); *H04L 67/325* (2013.01); *G06F 2209/509* (2013.01); *H04L 41/0896* (2013.01); *H04L 67/1097* (2013.01)

CONTAINER-BASED MOBILE CODE OFFLOADING SUPPORT SYSTEM IN CLOUD ENVIRONMENT AND OFFLOADING METHOD THEREOF

FIELD OF THE INVENTION

The present invention relates to the field of computer application system, and more particularly, to a container-based mobile code offloading support system in a cloud environment and the offloading method thereof.

BACKGROUND

Currently, smartphone is increasingly popular and the amount of wearable device is growing rapidly; although the performance configuration of a terminal device is also continuously developing, computing performance and battery life are greatly limited when confronting with complex mobile applications. Mobile Cloud Computing (MCC) utilizes almost infinite resources of cloud to expand the capacity of a mobile device, thereby improving user experience of mobile applications and extending the power usage time of the device at the same time.

Mobile Code Offloading (MCO) is a common method in mobile cloud computing. Conventional mobile applications adopt client-server models, separate a remotely executed part of a server from a locally executed part of a terminal, and send request parameters to a could each time a task is performed remotely and wait for the execution result of the cloud. Unlike the conventional mobile applications, in MCO, when the mobile application confronts with a part with complex computing, the mobile device analyses the current context, such as current network environment, remaining battery capacity, and previous execution record, and determines whether this part of computing requires to be completed by a cloud based on the analysis result. If the current environment is not suitable for code offloading, for example, poor network conditions, this part of computing task continues to be completed locally. Otherwise, if the determination and analysis results show that offloading the code to the cloud platform for execution can be responded more rapidly and expends less power consumption, the mobile application sends the offloading request to the cloud, and sends this part of task code with a large amount of computation together with the parameters to the cloud for execution. The cloud distributes a runtime environment for this part of code to satisfy the execution requirements thereof after receiving the offloading request, generally, the cloud will provide an environment similar to the mobile operating system to execute these mobile application codes. After the computing execution is completed, the cloud will return the computing result to the terminal, the terminal will proceed with the subsequent operation execution after receiving the computing result.

At present, in order to provide the mobile operating system environment at the cloud, the cloud platform adopts a solution based on virtual machines. This solution brings additional virtual overhead since the terminal environment is simulated by virtualization via hardware, lowering the execution performance of the code inside the virtual machine. More seriously, the start cost of the virtual machine is large, when a new virtual machine is required, the cloud platform needs to install a sub-operating system in the new virtual machine and then starts it, the two operations of which are each experimental. This also means that when the offloading request is arrived, the start preparation process cannot be completed in the first place, therefore the request cannot be performed in time, causing the problem of a longer responding time of the mobile code offloading than that of local execution at a terminal. Moreover, the virtual machine occupies a lot of cloud resources, such as the occupations in memory and hard disk are significant, this solution seriously lowers the utilization rate of cloud resources.

Container technology is an operating system-level virtualization technology, unlike the additional virtualization overhead being required by hardware virtualization, container technology shares the kernel of the host operating system and expends few of computing performance, which is a lightweight resource isolation mechanism. Currently, in industry, container technology has been widely deployed in project servers, at the same time, various cloud platforms also support container technology. However, in a terminal environment structure, there is a great difference between kernels of the mobile operating system and the cloud host operating system, such that the mobile operating system cannot obtain the required functional interface from the kernel of the host operating system, which brings a significant difficult problem in executing the mobile operating system in the cloud platform system using containers. Currently, there is a lack of a solution of utilizing a container as a cloud execution environment in a scenario of mobile code offloading application.

SUMMARY

For the lack of existing solutions, the present invention is intended to provide, in a cloud environment, a container-based mobile code offloading support system which has a function of supporting execution of an offloading code by utilizing a container environment and eliminates a verbose start process in the cloud platform solution based on virtual machines, improving the computing capacity of the code in the execution environment and optimizing the resource usage rate of the cloud platform.

In order to realize the above purpose, according to an aspect of the present invention, a container-based mobile code offloading support system in a cloud environment is provided; the system comprises a front-end processing layer, a runtime layer and a back-end resource layer, wherein:

the front-end processing layer is located at a cloud portal and used for responding to an arrived offloading request in the first place, and comprises a request distribution module, a code caching module and a monitoring and scheduling module, wherein:

the request distribution module is used to capture a user offloading request and distribute the request to a particular container runtime environment for execution; the code caching module is used to search for an offloading code to be executed in cached data according to an application source of the request, and directly take the part of the code out of the cached data without making a request to a terminal if the offloading code is present; the monitoring and scheduling module is used to monitor usage of a container and reallocate improper resource configurations to update status data of the container;

the runtime layer is located at a main body of a cloud platform and used to provide an execution environment for a mobile code, and comprises a runtime module, wherein:

the runtime module is consisted of a plurality of mobile cloud containers causing a customized mobile operating system to be run in a container environment, so as to simulate an execution environment consistent with that of a terminal for an offloaded mobile application;

the back-end resource layer is located at the lowermost layer of a cloud server and used to support a platform, and comprises a resource sharing module and an extended kernel module, wherein:

the resource sharing module extracts and provides the common part in the plurality of mobile cloud containers of the runtime layer as shared resource; the extended kernel module performs a dynamic extension to a kernel of a host operating system of an original cloud platform, adds a kernel characteristic of a mobile operating system, and realizes the sharing of the kernel between the host operating system and the mobile cloud container, providing a precondition for the running of the mobile operating system in the container.

According to another aspect of the present invention, an offloading method is further provided, the method is on the basis of the above container-based mobile code offloading support system in a cloud environment and comprises the following steps:

(1) whether it is the first time that a platform responds to an offloading request is detected, if yes, the method goes to step (2), otherwise, the method goes to step (3);

(2) when it is the first time that the platform responds to mobile code offloading, an initial cloud platform system loads an extended kernel module to make a kernel support a kernel characteristic of a mobile operating system, so as to provide shared kernel support for mobile cloud containers in the runtime module; meanwhile, a resource sharing module is initialized to prepare shared resources required by a runtime for the mobile cloud container;

(3) a request distribution module captures offloading request data, and queries status data of a container to determine whether there is an available container execution environment at present, if yes, the method goes to step (4), otherwise, the method goes to step (5);

(4) a new mobile cloud container is started, in comparison with start procedure of a conventional virtual machine in which a kernel is loaded and a file system is prepared for an operating system, initialization process of the operating system is directly performed in start procedure of the mobile operating system in the container; the status data of the container is updated, and a newly started container and information such as the resource configuration thereof are written into a container status data storage;

(5) a source application of the offloading request is analyzed, and it is queried whether the part of the code is in currently cached codes, if yes, the method goes to step (7), otherwise, the method goes to step (6);

(6) a request is sent to a terminal device and a mobile code that is to execute the offloading request is received when the part of the code is not present in the cached data;

(7) the offloading request is distributed to a particular runtime environment for execution, and the execution result of the request is returned after the execution is completed; and it is determined whether a request flow is ended, if not, the method goes to step (3), otherwise, the method goes to step (8);

(8) after the task of code offloading is completed, the cloud platform offloads the extended kernel module to return to the initial status of the cloud platform, and the method ends.

Preferably, in step (1), the kernel extension is dynamically loaded by means of module mounting, and the extended module is consisted of a core driver specific to the mobile operating system.

Preferably, the initialization utilization of the resource sharing module comprises shared class libraries, shared read and write I/O, network controller and shared drivers in step (2).

Preferably, in step (6), the network connection established by the terminal device and a cloud transmits mobile application code that is to be executed.

With the above technical solutions designed through the present invention, in comparison with the prior art, the system of the present invention has the following advantages and technical effects:

(1) Prevention of the problem of repeatedly sending a code: considering that the code to be executed by a newly arrived offloading request possibly has been received by the cloud platform before this execution, the request distribution module 1 and the code caching module 2 are employed to analyze and process the newly arrived offloading request, and detect whether the executed code is cached by the cloud, avoiding multiple transmissions of repeated codes. The method of the present invention reduces the responding time of the offloading request and data consumption of the user of the mobile device.

(2) Optimization of the usage rate of the cloud resource: when a series of offloading codes are processed, the relationship between the resource required by the request and the resource provided by the cloud is constantly changed. The present invention adopts the monitoring and scheduling module 3 to monitor the usage of the resource of the current cloud in real time and maintain the status data of the container, which avoids the additional overhead caused by an extended idle of the resource by the dynamic recovery and allocation of the resource, and improves the resource usage rate of the cloud platform as a whole.

(3) High-performance runtime environment: the difficulty in processing the mobile offloading request is that the additional overhead outside of the computing time is within an acceptable range. The present invention discards the runtime environment based on virtual machines applied by the conventional cloud computing platform, and adopts the container environment as the runtime resource model instead. The container environment possesses a shorter start time and a computing performance almost without overhead, which provides a high-performance runtime environment for the offloading code, thereby satisfying the requirements of the mobile application request to high real time performance.

(4) Manageability: the present invention employs the resource sharing module 5 to extract and use the common part in different mobile cloud containers as shared resources, achieving a unified management to important resources of the mobile operating system in the container, the process of which is fully transparent to the operating system in the container, however.

(5) Dynamicity: in order to relieve the modification burden of existing mobile applications, the platform system of the present invention is compatible with conventional mobile offloading frames. Meantime, since the extended kernel module 6 is used, the method of the present invention provides a group of kernel module, the existing cloud platform systems can simply achieve the support of the extended kernel to the kernel characteristics of the mobile operating system by the dynamic mounting of the kernel without configuring and recompiling the kernel of the cloud server.

DETAILED DESCRIPTION

The present invention is further illustrated in detail in combination with the drawings and embodiments for a better understanding of the objects, the technical solutions and the advantages of the present invention. It should be noted that the detailed embodiments described herein are only used to explain the present invention, rather than limit the present invention.

Figure 1:
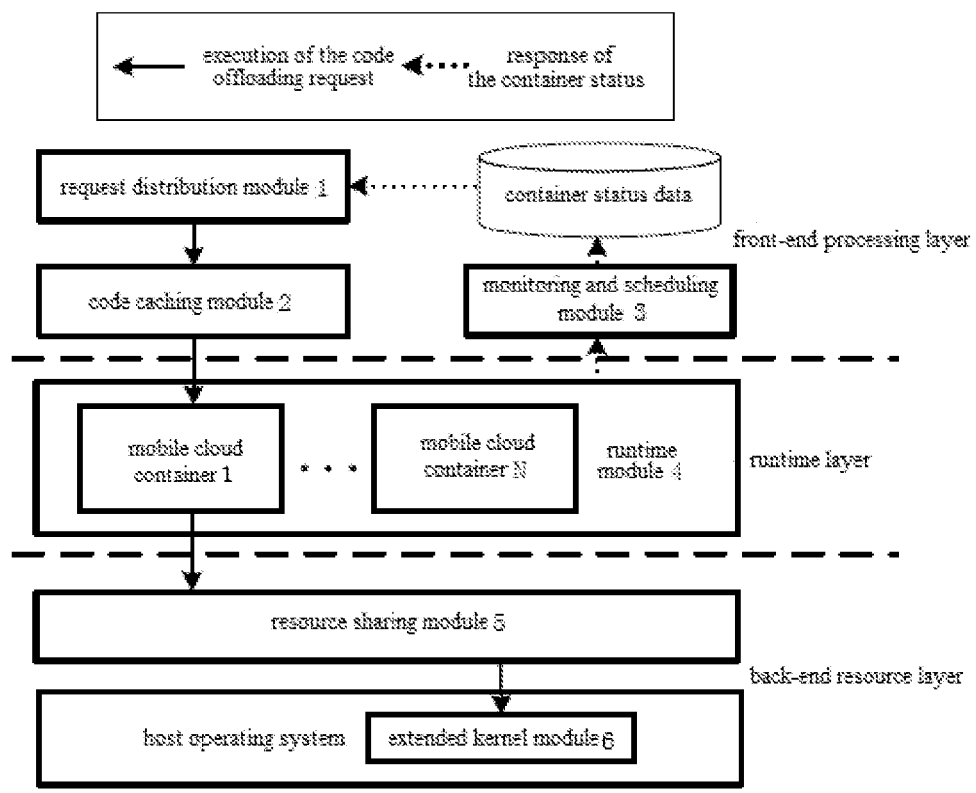
FIG. 1 is a modular block diagram of a container-based mobile code offloading support system in a cloud environment of the present invention.

As shown in FIG. 1, the system of the present invention comprises a front-end processing layer located at a cloud portal and responding to an offloading request, a runtime layer located at a main body of a cloud platform and providing an execution environment for a mobile code, and a back-end resource layer located at the lowermost layer of a cloud server and supporting a platform.

The front-end processing layer comprises a request distribution module 1, a code caching module 2, a monitoring and scheduling module 3 and status data of the container. The request distribution module 1 captures a user offloading request, selects the identification of the container most suitable for executing the request according to the currently stored status data of the container, creates a container start request when suitable container resources are not found, and transmits these container resource information and the request data to the code caching module 2; the code caching module 2 determines whether the code of the offloading request to be executed has been cached previously according to the application source of the request, if not, it is required to instruct the terminal device to send the corresponding execution code, if yes, the part of the code is directly taken out of the cached data, and the part of the code and data of the request parameters are transmitted to the runtime layer; the monitoring and scheduling module 3 monitors the container environment of the runtime layer in real time and maintain the status data of the container, this part of data are used to search for a most suitable execution environment for the newly arrived offloading request, meantime, the monitoring and scheduling module 3 further periodically detects whether there are containers that have been idle for a long time or have improperly allocated with resources, and reallocates the resource for this part of containers and updates the status data of the container.

The runtime layer comprises a runtime module 4. The runtime module 4 is consisted of a plurality of mobile cloud containers causing a customized operating system to be run in a container environment, so as to provide an execution environment for an offloaded mobile application data. The customization of the operating system run in the mobile cloud container is mainly identified through tracking the accessing condition of the offloading application request to the files, the key customization part comprises hardware drives that are not required by the offloading application, read-only class libraries in the mobile operating system, and a network management module conflicting with the container during the start process. Through the customization of the terminal environment simulated in the mobile cloud container, the requirement satisfaction of the runtime module 4 to the offloading request is not affected.

The back-end resource layer comprises a resource sharing module 5 and an extended kernel module 6. The resource sharing module 5 provides shared resource support to the plurality of mobile cloud containers of the runtime layer, which is achieved by the inclusion of the common resource part in the mobile operating system, the key content includes shared class libraries, read and write objects of the offloading code to the file system, the network management uniformly provided by the container daemon, and the mobile operating system driver that is less accessed by the offloading code but is indispensable. The extended kernel module 6 performs a dynamic extension to a kernel of a host operating system of an original cloud platform, adds a kernel characteristic on the basis of the core driver of the mobile operating system, and combines the characteristic of the terminal environment with the host operating system to realize the sharing of the kernel between the host operating system and the mobile cloud container, providing a precondition for the running of the mobile operating system in the container.

Figure 2:
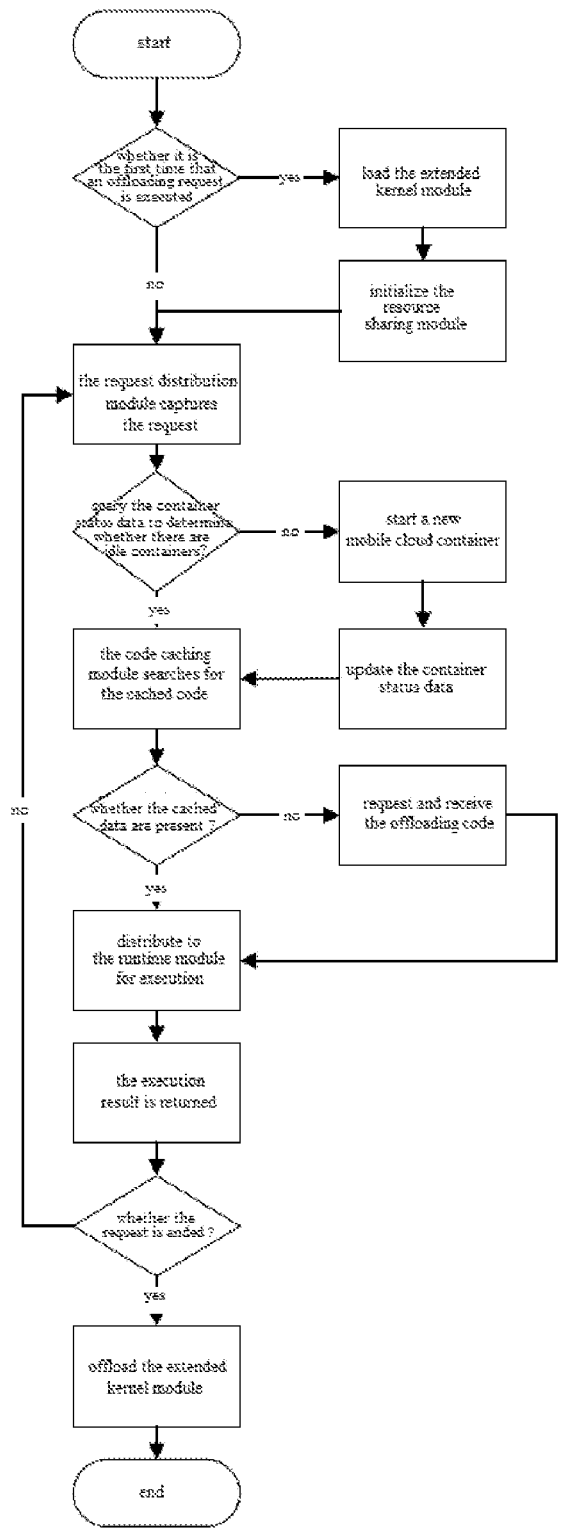
FIG. 2 is a flow chart of an offloading method in the container-based mobile code offloading support system in a cloud environment of the present invention.

As shown in FIG. 2, the present invention provides an offloading method in the container-based mobile code offloading support system in a cloud environment, and the method comprises the following steps:

(1) Whether it is the first time that a platform responds to an offloading request is detected, if yes, the method goes to step (2), otherwise, the method goes to step (3);

(2) When it is the first time that the platform responds to mobile code offloading, an initial cloud platform system needs to load an extended kernel module to make a kernel support a kernel characteristic of a mobile operating system, so as to provide shared kernel support for mobile cloud containers in the runtime module. Meanwhile, a resource sharing module is initialized to prepare shared resources required by a runtime for the mobile cloud container.

(3) A request distribution module captures offloading request data, and queries status data of a container to determine whether there is an available container execution environment at present, if yes, the method goes to step (4), otherwise, the method goes to step (5).

(4) A new mobile cloud container is started, and in comparison with start procedure of a conventional virtual machine in which a kernel is loaded and a file system is prepared for an operating system, initialization process (init process) of the operating system is directly performed in start procedure of the mobile operating system in the container. The status data of the container is updated, and a newly started container and information such as the resource configuration thereof are written into a container status data storage.

(5) A source application of the offloading request is analyzed, and it is queried whether the part of the code is in currently cached codes, if yes, the method goes to step (7), otherwise, the method goes to step (6).

(6) A request is sent to a terminal device and a mobile code that is to execute the offloading request is received when the part of the code is not present in the cached data.

(7) The offloading request is distributed to a particular runtime environment for execution, and the execution result of the request is returned after the execution is completed. Moreover, it is determined whether a request flow is ended, if not, the method goes to step (3), otherwise, the method goes to step (8).

(8) After the task of code offloading is completed, the cloud platform offloads the extented kernel module to return to the initial status of the cloud platform, and the method ends.

Figure 3:
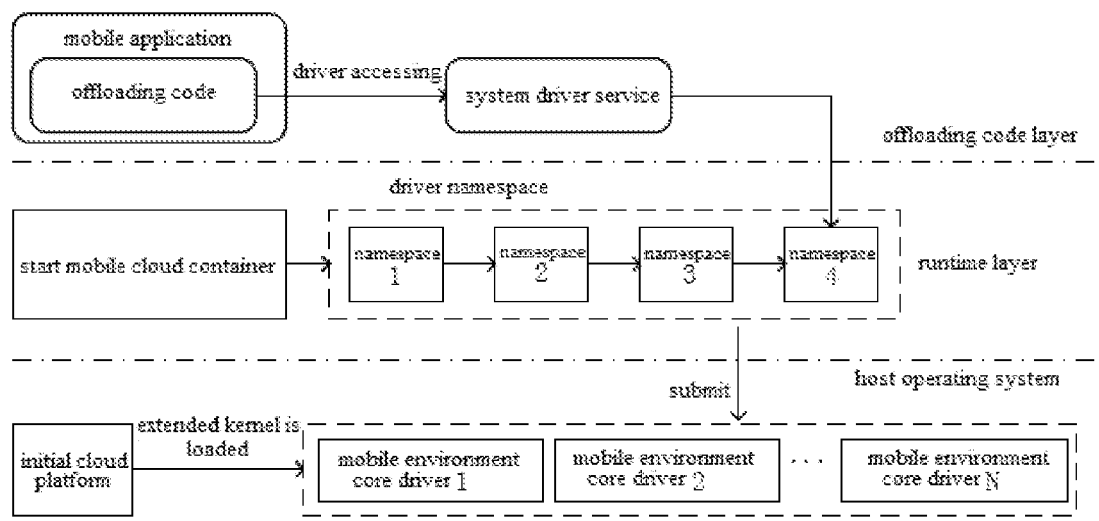
FIG. 3 is a schematic diagram of the extended core driver structure of the container-based mobile code offloading support system in a cloud environment of the present invention.

As shown in FIG. 3, a schematic diagram of the assessing structure of the offloading code to the kernel driver of the mobile operating system is shown. The present invention provides a container-based mobile code offloading support system in a cloud environment; the extended kernel module is consisted of the core driver of the mobile operating system; this part of driver is generated in the host operating system when the initial platform loads the extended kernel. After the offloading code sends an accessing request for the driver, first, the request is received by the system driver service in the mobile operating system and forwarded to a driver namespace in the runtime layer. The namespace will be generated whenever every mobile cloud container is started, which means that the true driver in the host operating system is mapped into the mobile cloud container, meantime, each container has a driver namespace isolated by itself, such that the mutual interference would not be produced. In turn, the driver namespace submits the accessing request for the driver to the true mobile environment core driver in the lowermost layer. The above whole process is transparent to the offloading code, and the offloading code is not required to involve a driver management. Adopting this driver structure, the present invention achieves that different mobile cloud containers can access the core driver in the mobile environment at the same time, and that the mutual interference of different driver accesses is prevented.

Those skilled in the art would easily appreciate that the above content is merely preferred embodiments of the present invention, but is not used for limiting the present invention. Any modifications, equivalent substitutions and improvements made within the spirit and principles of the present invention should be included in the protection scope of the present invention.

The invention claimed is:

1. An offloading method utilizing a container-based mobile code offloading support system, wherein the system includes a front-end processing layer, a runtime layer, and a back-end resource layer, wherein:

the front-end processing layer is located at a cloud portal and is configured to respond to an arrived offloading request in the first place, and the front-end processing layer includes a request distribution module, a code caching module and a monitoring and scheduling module, wherein:

the request distribution module is configured to capture a user offloading request and distribute the request to a particular container runtime environment for execution, the particular container runtime environment shares a kernel of a host operating system and is an operating system-level virtualization;

the code caching module is configured to search for an offloading code to be executed in cached data according to an application source of the request, and directly take the part of the code out of the cached data without making a request to a terminal if the offloading code is present;

the monitoring and scheduling module is configured to monitor usage of a container and reallocate improper resource configurations to update status data of the container;

the runtime layer is located at a main body of a cloud platform and configured to provide an execution environment for a mobile code, and comprises a runtime module, wherein:

the runtime module includes a plurality of mobile cloud containers causing a customized operating system to be run in a container environment, so as to simulate an execution environment consistent with that of a terminal for an offloaded mobile application;

the back-end resource layer is located at the lowermost layer of a cloud server and configured to support a platform, and comprises a resource sharing module and an extended kernel module, wherein:

the resource sharing module extracts and provides the common part in the plurality of mobile cloud containers of the runtime layer as shared resource; and the extended kernel module performs a dynamic extension to the kernel of the host operating system of an original cloud platform, adds a kernel characteristic of a mobile operating system, and realizes the sharing of the kernel between the host operating system and the mobile cloud container, providing a precondition for the running of the mobile operating system in the container, the method comprising:

(1) determining whether it is the first time that a platform responds to an offloading request is detected;

(2) when it is the first time that the platform responds to mobile code offloading, loading, by an initial cloud platform system, an extended kernel module to make a kernel support a kernel characteristic of a mobile operating system, so as to provide shared kernel support for mobile cloud containers in the runtime module, and initializing a resource sharing module to prepare shared resources required by a runtime for the mobile cloud container;

(3) a request distribution module capturing offloading request data, and querying status data of a container to determine whether there is an available container execution environment at present;

(4) when there is no available container execution environment at present, starting a new mobile cloud container, in comparison with start procedure of a conventional virtual machine in which a kernel is loaded and a file system is prepared for an operating system, directly performing an initialization process of the operating system in start procedure of the mobile operating system in the container, updating the status data of the container, and writing a newly started container and information such as the resource configuration thereof into a container status data storage;

(5) analyzing a source application of the offloading request, and querying whether the part of the code is in currently cached codes;

(6) when the part of the code is not in currently cached codes, sending a request to a terminal device and receiving a mobile code that is to execute the offloading request;

(7) distributing the offloading request to a particular runtime environment for execution, returning the execution result of the request after the execution is completed, and going to the capturing step when a request flow is not ended;

(8) when the request flow is ended, after the task of code offloading is completed, the cloud platform offloading the extended kernel module to return to the initial status of the cloud platform, and ending the method.

2. The container-based mobile code offloading method according to claim 1, wherein in step (1), the kernel extension is dynamically loaded by means of module mounting, and the extended module includes a core driver specific to the mobile operating system.

3. The container-based mobile code offloading method according to claim 1, wherein when it is the first time that the platform responds to mobile code offloading, the resource sharing module comprises shared class libraries, shared read and write I/O, network controller and shared drivers.

4. The container-based mobile code offloading method according to claim 1, wherein when the part of the code is not in currently cached codes, a network connection transmits mobile application code that is to be executed, the network connection is established by the terminal device and a cloud.

* * * * *